Jan. 14, 1964  H. F. BENDER  3,118,061
RADIATION DETECTOR FOR HEAT RESPONSIVE DIRECTION FINDERS
Filed March 25, 1960
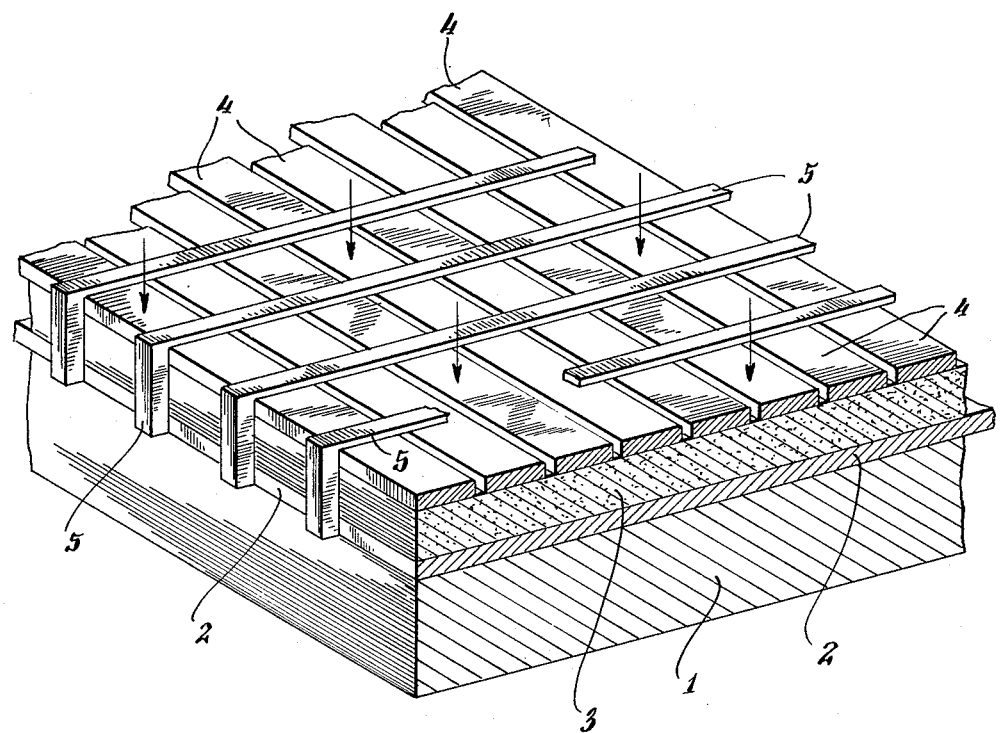
INVENTOR.
*Hans F. Bender*
BY
*Andrew L. Yey*
ATTORNEY.

3,118,061
RADIATION DETECTOR FOR HEAT RESPONSIVE DIRECTION FINDERS
Hans Friedrich Bender, Klufterstr. 80, Bad Godesberg-Friesdorf, Germany
Filed Mar. 25, 1960, Ser. No. 17,651
Claims priority, application Germany Mar. 25, 1959
4 Claims. (Cl. 250—83)

Heat responsive direction finders are well known in the art in which the natural thermal radiation of an object on which bearings have been taken is compared with the radiation emitted from the surroundings of the object. Practically, only thermocouples or bolometers or temperature sensitive resistors can be used as the radiation sensitive detector in such devices, because other types of detectors fail to have sufficient sensitivity within the range of long-wave radiation. However, these heat sensitive radiation detectors respond with a relatively great time lag, so that difficulties may arise if a greater field of view is intended to be scanned.

In order to eliminate these difficulties, the invention provides a radiation sensitive detector which consists of a plurality of small heat responsive detectors in mosaic-screen arrangement. The detectors are scanned periodically, and are so designed that they supply a signal which is a function of the entire radiant energy impinging upon them between two scannings.

Owing to the fact that a greater field of view is covered by the consecutively scanned mosaic-screen detectors, the time lag in their response is of no importance. The entire radiant energy and not only the radiation which impinge upon the detector during the short interval of scanning, is utilized for forming the signal. It will be observed that the energies concerned are extremely small and therefore, extremely high measuring technical requirements are being made.

In accordance with the invention detectors are provided having condensers which are bridged by means of high-resistance temperature sensitive resistors. The condensers then can be charged up to a certain voltage at each scanning. The resistors heat up in accordance with the radiant energy impinging thereupon, and accordingly, the condensers will discharge between two scannings with an intensity proportional to the intensity of the radiation. The radiation sensitive detector is advantageously scanned by means of an electronic beam similar to the scanning of a television picture.

An embodiment of the invention is more fully explained in the following detailed description in which reference is made to the schematic diagrammatic illustration shown in the accompanying drawing.

The illustration shows, in an enlarged view, a cutaway portion of a radiation sensitive detector according to the invention. Such a radiation sensitive detector is arranged in place of the photocathode in an image tube well known from television cameras and is periodically scanned by means of an electronic beam. The radiation sensitive detector is arranged in the focal plane of a concave mirror.

The radiation sensitive detector is provided with a carrier layer 1 made from aluminum oxide ($Al_2O_3$) and having a thickness of approx. $5 \times 10^{-3}$ mm. On this layer is deposited by evaporation a gold layer 2 having a thickness of approx. $10^{-5}$ mm. on which is provided a layer 3 of barium strontium titanate of $10^{-4}$ mm. thickness which is also deposited by evaporation. On this latter layer lie strips 4 made from a semi-conductive material the electric resistance of which varies considerably with temperature. On these strips 4 and in transverse direction to them are provided gold strips 5 which subdivide the strips 4 in mosaic-screen like arranged sections. The gold strips 5 are conductively connected with the gold layer 2. The thickness of the strips 4 and that of the gold strips 5 is also approx. $10^{-5}$ mm. As indicated in the drawing by means of arrows, the radiation impinges from above upon the semi-conductor layer 4.

A plurality of small condensers are formed by the semi-conductor portions 4 between the gold strips 5 together with the gold layer 2. The barium strontium titanate layer 3 is the dielectric. After having been charged once, these condensers discharge slowly via the high-resistance semi-conductor layer 4 and the strips 5. The resistance of the semi-conductor layer varies with the temperature and thus also with the radiant intensity impinging upon each of the semi-conductor portions. Thus, each of the condensers discharges between two scannings, the discharge being greater the higher the intensity of the radiation. Scanning is advantageously effected at such time intervals that the contrasts and the differences of potential caused by different radiation intensities on the neighbouring detectors just appear as maxima. Actually, a short time after scanning and re-charging of all of the condensers 2, 3, 4, all differences of potential are small and thus the contrasts are not yet distinct. At almost complete discharge of the condensers, the contrasts are again blurred. Therebetween lies an optimum to which the scanning period should preferably be syntonized.

It is possible by means of the radiation sensitive detector conceived and constructed according to the invention to detect aircraft flying at an altitude of 10 to 20 kilometres. Such detection is based on the natural radiation of the flying craft even if their outside temperature is practically the same as the temperature of the surrounding stratosphere.

I claim:
1. A radiation sensitive detector which comprises a first electrically conductive surface defining a first capacitor plate; a dielectric layer adjacent said first surface; a plurality of temperature-sensitive resistive elements adjacent said dielectric layer, the surface of each of said resistive elements adjoining said dielectric layer defining a second capacitor plate; and electrically conductive means in electrically conducting relationship between said resistive elements and said first surface.

2. The detector of claim 1 wherein each of said resistive elements is a semiconductor.

3. The detector of claim 2 wherein the material of each of said first surface and said conductive means is a noble metal.

4. The detector of claim 3 wherein said noble metal is gold.

References Cited in the file of this patent
UNITED STATES PATENTS

| | | |
|---|---|---|
| 2,175,692 | Iams | Oct. 10, 1939 |
| 2,288,766 | Wolff | July 7, 1942 |
| 2,412,822 | Malter | Dec. 17, 1946 |
| 2,732,469 | Palmer | Jan. 24, 1956 |
| 2,816,954 | Huffman | Dec. 17, 1957 |
| 2,903,596 | Reed | Sept. 8, 1959 |
| 2,909,668 | Thurlby | Oct. 20, 1959 |
| 2,920,137 | Garbuny | Jan. 5, 1960 |
| 2,951,175 | Null | Aug. 30, 1960 |
| 2,975,387 | Georgen et al. | Mar. 14, 1961 |
| 2,999,177 | Null et al. | Sept. 5, 1961 |

OTHER REFERENCES

Detecting Low-Level Infrared Energy, by Dubner, Schwartz, and Shapiro, Electronics, Vol. 32, No. 26, June 26, 1959, pages 38–41.